United States Patent

Sevier et al.

Patent Number: 5,912,448
Date of Patent: Jun. 15, 1999

[54] METHOD AND APPARATUS FOR DETECTING PAPER SKEW IN IMAGE AND DOCUMENT SCANNING DEVICES

[75] Inventors: Richard G. Sevier, Boise, Id.; Frank P. Carau, Sr., Loveland, Colo.

[73] Assignee: Hewlett-Packard Company, Palo Alto, Calif.

[21] Appl. No.: 08/857,613

[22] Filed: May 16, 1997

[51] Int. Cl.$^6$ .................................................. G06K 7/10
[52] U.S. Cl. ........................................... 235/454; 358/488
[58] Field of Search ................................ 235/462.09, 463, 235/469, 454; 399/370, 371, 372; 358/486, 488

[56] References Cited

U.S. PATENT DOCUMENTS

| | | | |
|---|---|---|---|
| 5,280,160 | 1/1994 | Yamamoto et al. | 235/454 |
| 5,343,028 | 8/1994 | Figarella et al. | 235/462 |
| 5,506,918 | 4/1996 | Ishitani | 382/289 |
| 5,517,587 | 5/1996 | Baker et al. | 235/462 |
| 5,528,387 | 6/1996 | Kelly et al. | 358/488 |
| 5,555,084 | 9/1996 | Vetromile et al. | 355/317 |
| 5,568,281 | 10/1996 | Kochis et al. | 358/475 |

*Primary Examiner*—Donald Hajec
*Assistant Examiner*—Diane I. Lee

[57] ABSTRACT

A method and apparatus for determining the extent of skew present in a document being scanned using only the primary vision transducer. The primary vision transducer is wider than the width of the media to be scanned and logically divided into a central image gathering portion and marginal skew detection and image gathering portions.

10 Claims, 5 Drawing Sheets

METHOD AND APPARATUS FOR DETECTING PAPER SKEW IN IMAGE AND DOCUMENT SCANNING DEVICES

FIELD OF THE INVENTION

The present invention relates to an apparatus and method for determining the extent to which a document which is being scanned by an optical scanning device is skewed in relation to the scanner's primary vision transducer.

BACKGROUND OF THE INVENTION

Digital document and image scanning devices may include a bed or other surface across which a document or other image bearing medium is passed or positioned in combination with an optical scanning device, typically a CCD or CIS device for obtaining an optical image from the document. Often times, in combination with the bed or the optical scanning device, separate method or means for detecting the presence of a document which is skewed and/or misregistered, hereinafter simply skewed, in excess of some predefined limit is employed. This feature allows the scanning device to sense the presence of a condition wherein the document is skewed relative to the direction of travel of the optical scanning device. Detecting skew is important because the document may be skewed to such an extent that data or imagery may be lost due to the fact that such data or imagery falls outside the range of the optical scanning device.

Additionally, if a document is skewed in excess of the limits of the document feeder, a paper jam can result. In order to provide for smooth and continuous operation of the document feeder, skew detection is used to detect the position of a document which is skewed in excess of some predefined limit, thus allowing the feed mechanism to be deactivated and/or reversed before a paper jam occurs. Also, optical character recognition algorithms rely on a generally horizontal base line in order to recognize letters, words and lines of text as well as other graphic elements. Skew introduces error into this process.

Currently, one means for detecting the presence of a document which is skewed in excess of some predefined limit uses a pair of marginal sensors which are separate components from the primary vision transducer, raising the cost and complexity of the device. Each sensor is positioned at a distance from the other which is approximately equal to distance between the two side margins of the document being fed through the document feeder. Operatively connected to each of the two the marginal sensors is a means for deactivating the optical scanning device and/or the feed mechanism when a portion of the document being fed enters the range of either of the marginal sensor.

In accordance with this prior art device and method, a pair of marginal sensors are employed each requiring additional electrical and mechanical connection and peripheral devices which operate in concert with the marginal sensors.

SUMMARY OF THE INVENTION

The present invention is directed to an apparatus and method for determining the extent to which a document which is being scanned by an optical scanning device is skewed in relation to the scanner's primary vision transducer. Specifically, the present invention employs the primary vision transducer, rather than additional optical or mechanical sensors, to detect paper skew in the scanning device.

Most scanning devices employ a charge coupled device (CCD) or contact image sensing (CIS) elements as the optical transducer which converts the image to digital signals which are organized into a rastorized digital image. The individual optical elements are arranged in an array which is equal the width of the maximum sized media which is supported by the scanner to obtain data across the entire width of the document or other image bearing media. In the present invention, the optical scanning device includes a primary vision transducer array, collectively hereinafter simply referred to as transducer, configured to provide an increased width or range of optical sensing and data collection.

In a first embodiment of the invention, the center portion of the primary vision transducer has a width equal to the width of the maximum sized media supported by the scanner and is designated to obtain the optical image from the document or other image bearing media, while the two marginal or ends portions of the primary vision transducer are designated to obtain optical information relating to the position of the marginal edges of the document being fed into or through the scanning device. In the event that media is sensed in either of the two marginal portions of the primary vision transducer, a processor electrically connected to the primary vision transducer interprets this optical data if there is excessive skew and if so, the scanning function is discontinued and the operator alerted.

In a second embodiment of the invention, the center portion of the primary vision transducer is designated to obtain the optical image from the document or other image bearing media while the marginal portions are used for both image data to determine collection as well as skew detection. The relative widths of these portions can be dynamically altered depending upon the width of the media to be scanned. When the optical scanning device senses the presence of media, the processor determines the distance between the leading corner of the media and a predetermined limit for the scanning device. As the media continues to travel relative to the primary vision transducer, the processor determines the angle of skew of the edge of the media. Next the processor determines by extrapolation whether the side margin of the media will progress outside the range of the primary vision transducer. In the event that the processor interprets data relating to location of the leading corner of the media and the angle of skew of the media as indicating that the media is skewed in excess of a predefined limit, the scanning operation will cease.

While the second embodiment provides for the completion of more scan jobs than the first by not terminating all jobs which are skewed, it assumes that an additional piece of data, namely the paper length, is known or at least assumed for a particular scan job. This data can be provided via a software or a hardware input from the user, attached computer or simply default to a standard length. The second embodiment also allows the measured skew angle to be available for secondary use by, for example, image processing or optical character recognition software.

These and other features of the invention will be more fully understood and appreciated with reference to the following description, the claims and the accompanying drawings.

DETAILED DESCRIPTION OF THE INVENTION

Referring now to FIGS. 1 through 5, the elements and features of the method and apparatus for detecting paper skew in image and document scanning devices will be more fully understood and appreciated. The invention is generally applicable to document scanning devices, generally designated a 100, including flat bed scanners, hand held scanners, compact scanners, with or without automatic document faders.

Figure 1:
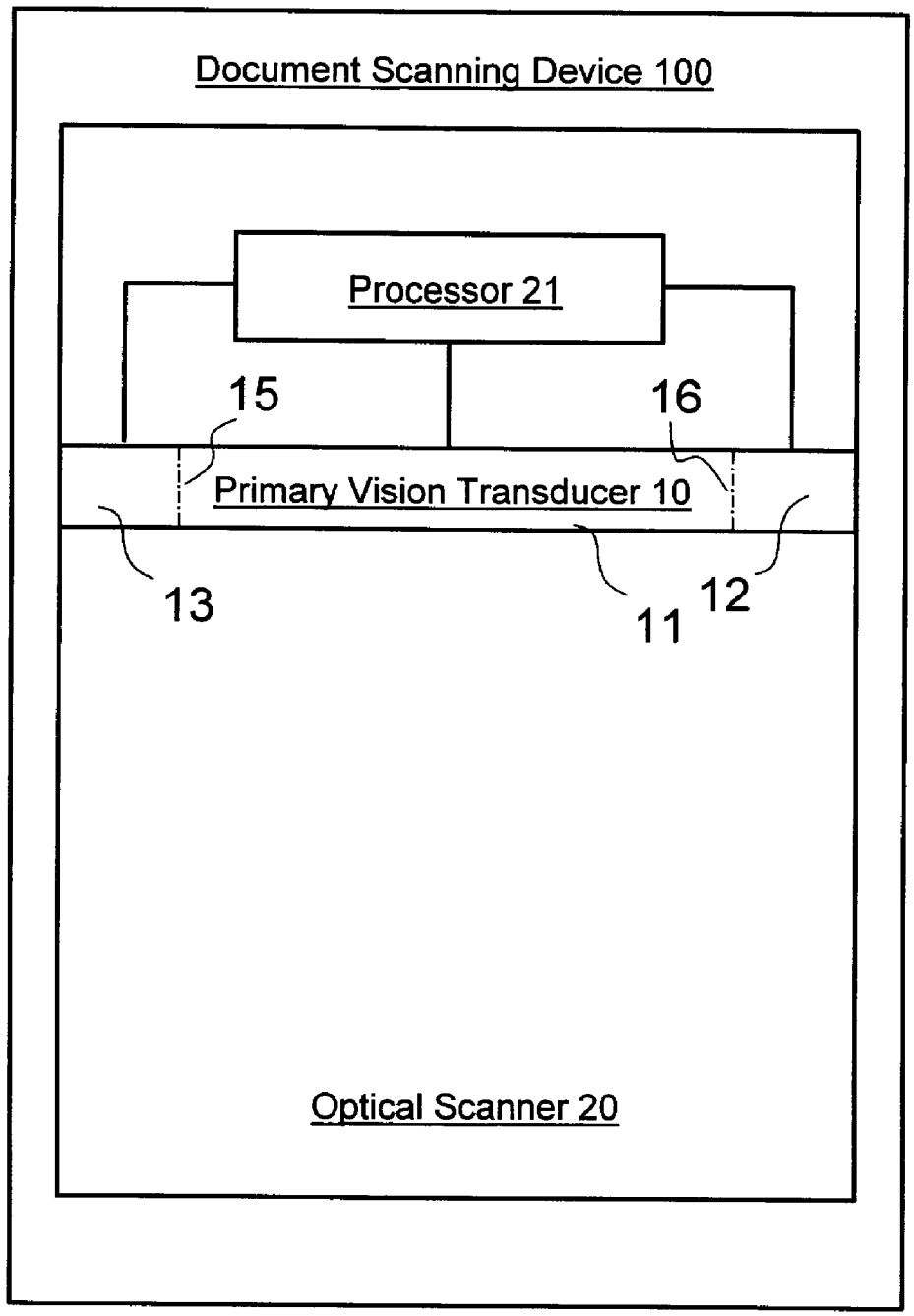
FIG. 1 is a schematic representation of a scanning device according to the first embodiment of the invention employing a primary vision transducer across which a sheet of media is traveling in a normal orientation.
Figure 2:
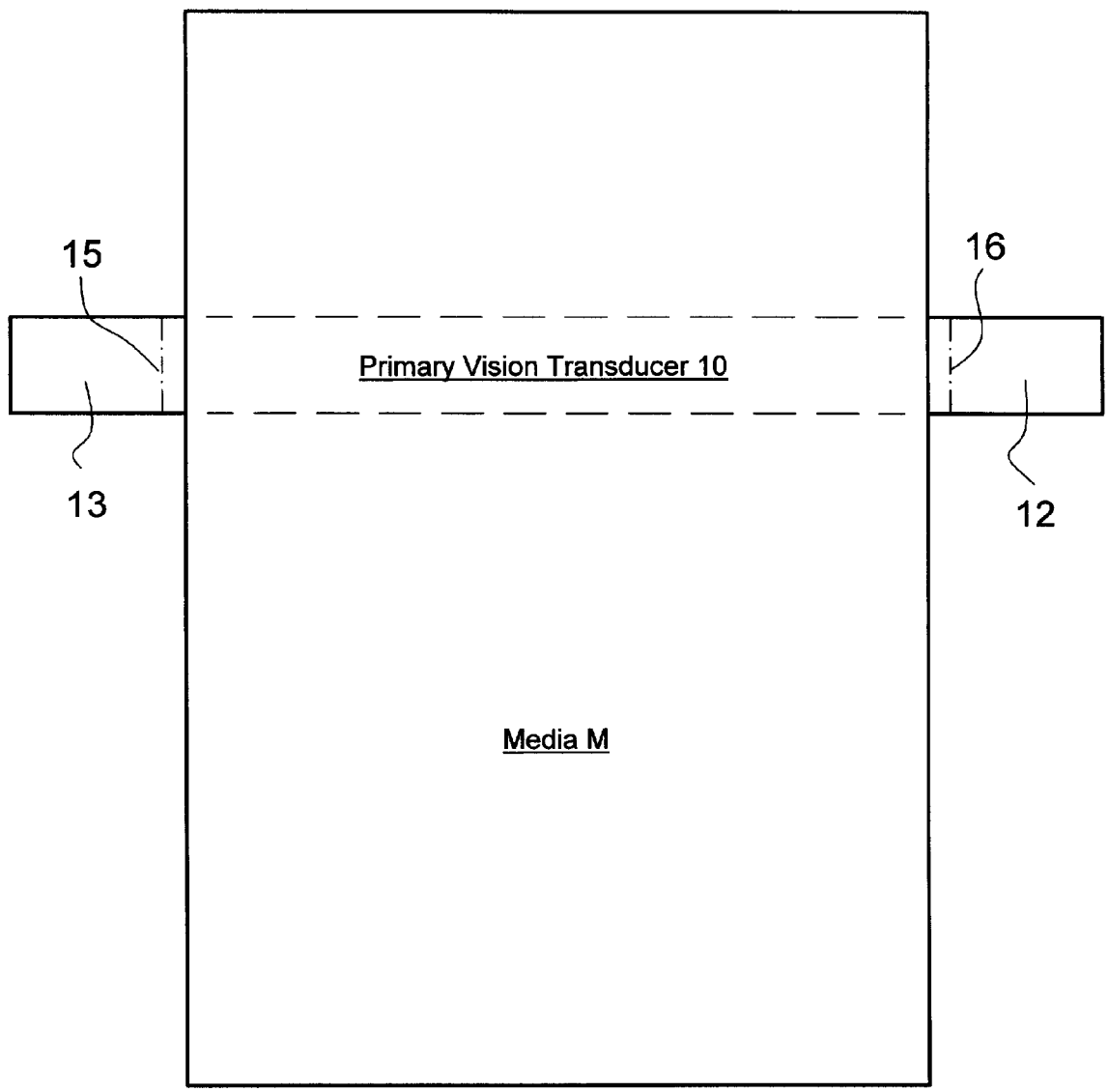
FIG. 2 is a schematic representation of a primary vision transducer of the first embodiment of the invention across which a sheet of media is traveling in a normal orientation.
Figure 3:
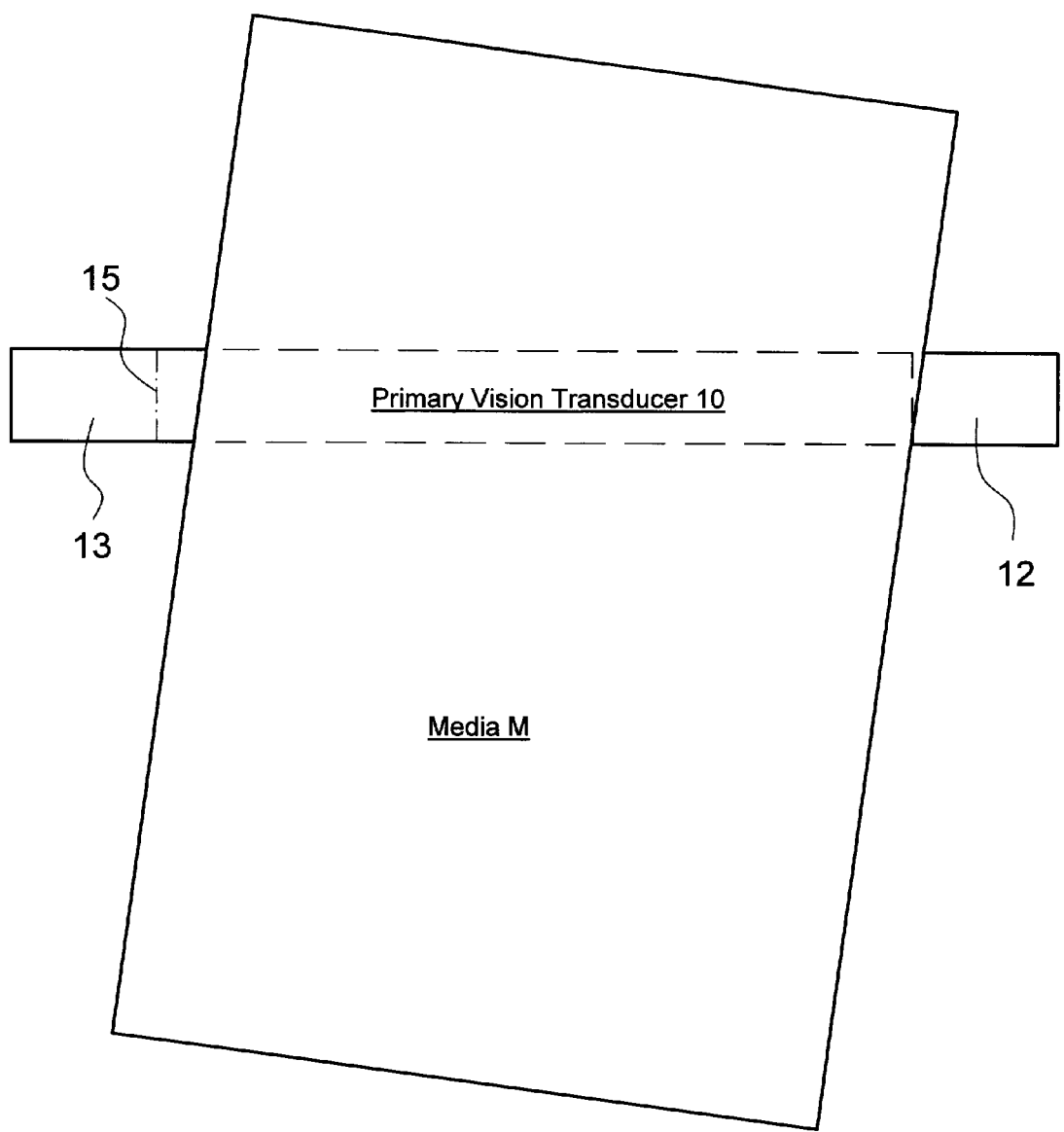
FIG. 3 is a schematic representation of a primary vision transducer of the first embodiment of the invention across which a sheet of media is traveling in a skewed right orientation.

Referring to FIGS. 1 through 3, primary vision transducer 10 is logically divided into three separate and distinct portions; center scan portion 11, right skew detection portion 12 and left skew detection portion 13. Rather than a physical division, primary vision transducer 10 is divided in the sense that a set of predefined ranges corresponding to the respective widths of center scan portion 11, right skew detection portion 12 and left skew detection portion 13 are defined within processor 21, other digital logic or similar data analysis circuitry within or connected to optical scanner 20. When the presence of data is sensed outside center scan portion 11, this data is interpreted by processor 21 as lying within either right skew detection portion 12 or left skew detection portion 13. Left skew margin 15 defines a boundary between center scan portion 11 and left skew detection portion 13. Similarly, right skew margin 16 defines a boundary between center scan portion 11 and right skew detection portion 12.

Referring to FIG. 2, media M is shown positioned relative to primary vision transducer 10 in a normal orientation. In a normal orientation media M passes over center portion 11 of primary vision transducer 10. In this normal orientation, the probability of all data presented on media being sensed and scanned is very high.

Referring to FIG. 3, media M is shown positioned relative to primary vision transducer 10 in a skewed right orientation. In a skewed right orientation, the left leading corner of media M and the greater percentage of the central portion of media M passes over center portion 11 of primary vision transducer 10. As the travel of media M proceeds across primary vision transducer 10, the left margin of media M trails over left skew detection portion 13 of primary vision transducer 10. The right leading corner of media M passes over right skew detection portion 12 of primary vision transducer 10. As the travel of media M proceeds across primary vision transducer 10, the right margin of media M trails over towards center portion 11 of primary vision transducer 10. If the left margin of media M trails over left skew detection portion 12 of primary vision transducer 10 far enough, processor 21 will terminate the scanning process.

Figure 4:
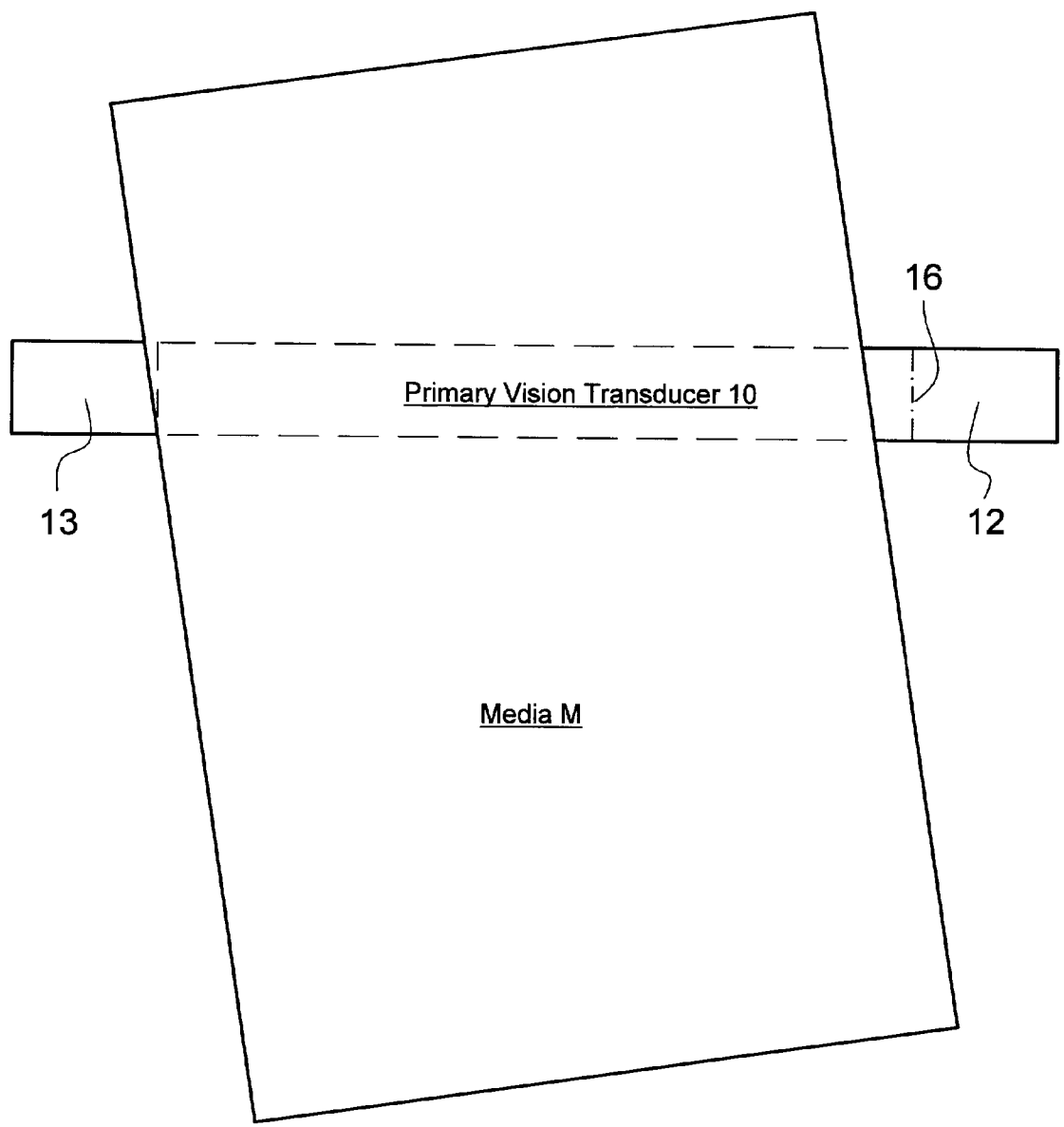
FIG. 4 is a schematic representation of a primary vision transducer of the first embodiment of the invention across which a sheet of media is traveling in a skewed left orientation.

Referring to FIG. 4, media M is shown positioned relative to primary vision transducer 10 in a skewed left orientation. In a skewed left orientation, the right leading corner of media M and the greater percentage of the central portion of media M passes over center scan portion 11 of primary vision transducer 10. As the travel of media M proceeds across primary vision transducer 10, the right margin of media M trails over right skew detection portion 12 of primary vision transducer 10. The left leading corner of media M passes over left skew detection portion 13 of primary vision transducer 10. As the travel of media M proceeds across primary vision transducer 10, the left margin of media M trails over towards center portion 11 of primary vision transducer 10. Once the right margin of media M trails over right skew detection portion 12 of primary vision transducer 10 to a predefined limit, processor 21 will terminate the scanning process.

Figure 5:
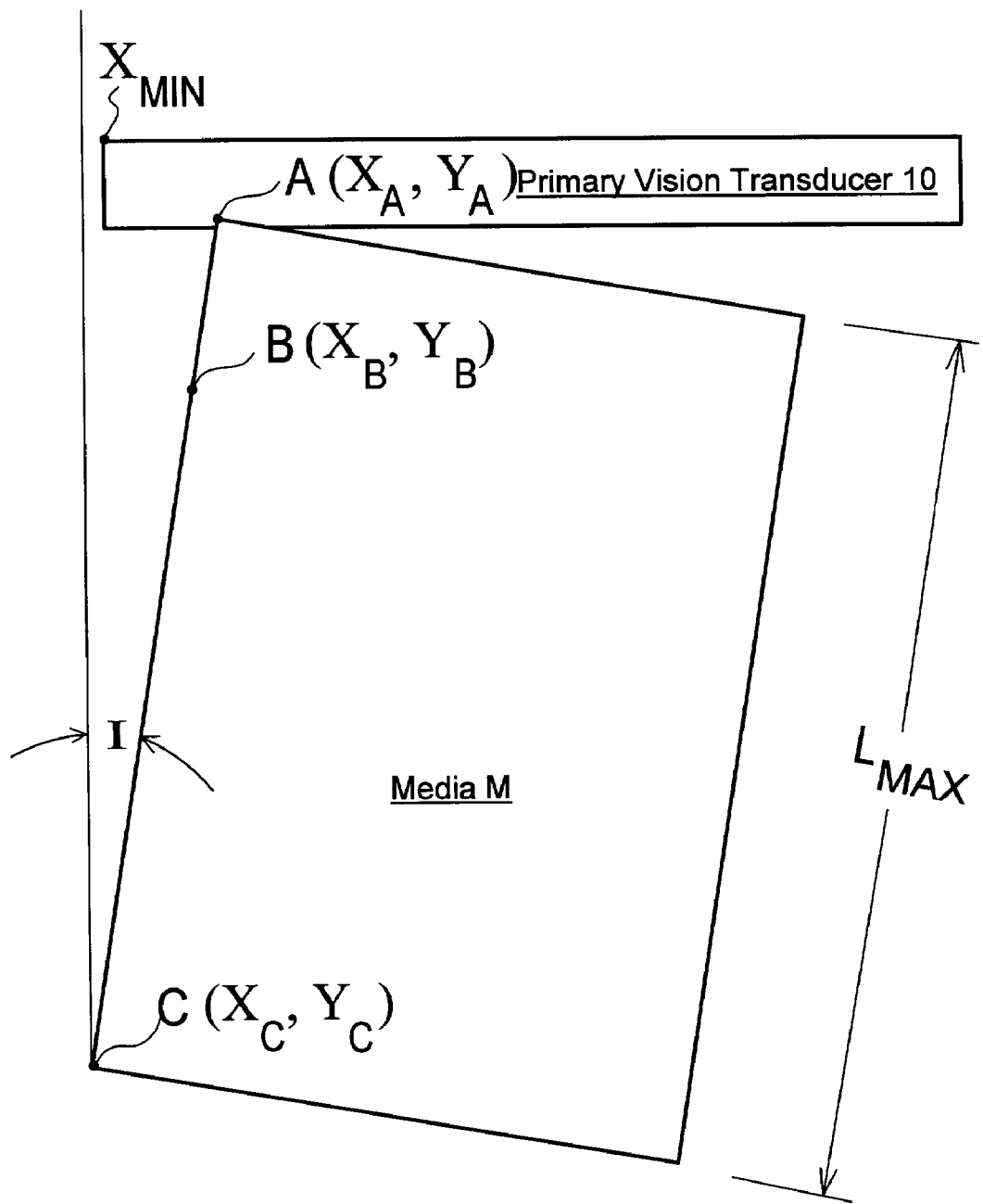
FIG. 5 is a schematic representation of a primary vision transducer of the second embodiment of the invention across which a sheet of media is traveling in a skewed right orientation.

In a second embodiment of the invention shown in FIG. 5, as media M is scanned, primary vision transducer 11 senses leading edge of media M. Processor 21 notes the distance point A, defined in FIG. 5 as the leading left corner of media M, is from left marginal limit of the scanner, here defined as $X_{MIN}$. Point A is defined by the coordinates $(X_A, Y_A)$, where $Y_A$ is equal to 0. As media M continues to travel across primary vision transducer 10 processor 21 determines an angle I, defined as the skew angle, which equals $$\tan(\frac{(X_A - X_B)}{(Y_A - Y_B)})$$

where $(X_B, Y_B)$ are the coordinates for a second point B along the left marginal edge of media M. Note that $Y_B$ has a negative value. Following the acquisition of this data, processor 21 extrapolates the projected location of point C, defined in FIG. 4 as the trailing left corner of media M, if scanning were to continue with media M in the sensed orientation for any given length L of media M. In the event that the X coordinate, $X_C$, lies outside of the left marginal limit of the scanner, processor 21 terminates the scanning process. This extrapolation is accomplished using the equation $$X_C = X_A - L_{MAX}(\sin(\alpha))$$

where is $L_{MAX}$ is defined as maximum length of media M. If $X^C$ is less than $X^{MIN}$ $X_C$ lies outside the left marginal scanner limit and there is a high probability that there is excessive skew and processor 21 will terminate the scanning process. A similar analysis is made for right skewed documents.

A second method for predicting if the skew angle is so great that it interferes with the scanning process is illustrated with reference to FIG. 5. The second method determines a skew rate, $R_S$ based upon the coordinates of point $A(X_A, Y_A)$ at time zero and the coordinates of point B $(X_B, Y_B)$ at time $T_1$. Then, using the initial starting point, $(X_A, Y_A)$, the skew rate $R_S$ and a predicted time $T_C$ at which point C would cross primary vision transducer 10, based upon and assuming a constant scan rate and a predetermined or selected maximum media length, the X coordinate of point C, $X_C$, can be calculated. Alternatively, since $R_S$ is simply the reciprocal of the slope of the edge of media M and a point on the line defining the edge is known, using the equation $$y = mx + b$$

where $m = R_S$, the Y axis intercept, b, can be calculated yielding the equation for a line containing the edge of media M. From this equation, the intersection point, $(X_i, Y_i)$, with a line defined by $X=X_{MIN}$ can be obtained by solving the equations $$Y_i = R_S + b$$

$$X_i = \frac{Y_i - b}{R_S}.$$

Then, the distance between points $(X_A, Y_A)$ and $(X_i, Y_i)$ can be determined using the equation $$\text{distance} = \sqrt{(X_A - X_i)^2 + (Y_A - Y_i)^2}$$

This distance represents the maximum length a piece of media may have for a given skew angle and positioned with its leading corner at a particular point along transducer 10.

While there is shown and described the preferred embodiment of the invention, it is to be distinctly understood that this invention is not limited thereto but may be variously embodied to practice within the scope of the following claims.

What is claimed is:

1. An optical scanning device for scanning media which comprises:

a primary vision transducer having a width greater than the width of the media which is logically divided into a center portion being designated to obtain image data from the media and a pair of marginal portions, where each marginal portion is designed to obtain data representing marginal edges of the media; and data analysis circuitry configured to interrupt operation of the optical scanning device upon detecting of the presence of data in the marginal portions of the transducer.

2. An optical scanning device for scanning media which comprises:

a primary vision transducer having a width greater than the width of the media which is logically divided into a center portion being designated to obtain image data from the media and a pair of marginal portions, where each marginal portion is designed to obtain data representing marginal edges of the media as well as image data;

data analysis circuitry configured to detect and note a first data point representing the location of a leading corner of the media and at least one other point along an edge of the media.

3. The optical scanning device of claim 2 wherein the data analysis circuitry is configured to detect and note the location of a second data point with respect to the transducer which represents a point long a marginal edge of the media and the data analysis circuitry is further configured to extrapolate and predict the location of a third point representing a trailing corner along a common edge containing both the leading corner and the trailing corner based upon the locations of the leading corner and the second data point.

4. The optical scanning device of claim 3 wherein the data analysis circuitry is further configured to terminate scanning upon determining that the location of the trailing corner lies outside of a predefined limit.

5. The optical scanning device of claim 4 wherein the data analysis circuitry is configured to extrapolate a horizontal location of the trailing edge by:

calculating a skew angle which is equal to the inverse tangent of the quotient of the distance between a first horizontal coordinate representing the horizontal location of the leading corner and a second horizontal coordinate representing the horizontal location of the second data point and the distance between a first vertical coordinate representing the vertical location of the leading corner and a second vertical coordinate representing the vertical location of the second data point; and multiplying the sine of the skew angle by the length of the media and subtracting the resulting product from the first horizontal coordinate.

6. The optical scanning device of claim 4 wherein the data analysis circuitry is configured to extrapolate a horizontal location of the trailing edge by:

calculating a skew rate which is equal to quotient of the distance between a first horizontal coordinate representing the horizontal location of the leading corner and a second horizontal coordinate representing the horizontal location of the second data point and the distance between a first vertical coordinate representing the vertical location of the leading corner and a second vertical coordinate representing the vertical location of the second data point; and using the skew rate and the leading corner to predict the location of the third point.

7. The optical scanning device of claim 3 wherein the data analysis circuitry is configured to extrapolate a horizontal location of the trailing edge by:

calculating a skew angle which is equal to the inverse tangent of the quotient of the distance between a first horizontal coordinate representing the horizontal location of the leading corner and a second horizontal coordinate representing the horizontal location of the second data point and the distance between a first vertical coordinate representing the vertical location of the leading corner and a second vertical coordinate representing the vertical location of the second data point; and multiplying the sine of the skew angle by the length of the media and subtracting the resulting product from the first horizontal coordinate.

8. The optical scanning device of claim 3 wherein the data analysis circuitry is configured to extrapolate a horizontal location of the trailing edge by:

calculating a skew rate which is equal to quotient of the distance between a first horizontal coordinate representing the horizontal location of the leading corner and a second horizontal coordinate representing the horizontal location of the second data point and the distance between a first vertical coordinate representing the vertical location of the leading corner and a second vertical coordinate representing the vertical location of the second data point; and using the skew rate and the leading corner to predict the location of the third point.

9. A method of controlling an image scanning device having a primary vision transducer having a width greater than the width of media to be scanned comprising:
- logically dividing the primary image transducer into a center portion and a pair of marginal portions;
- designating the center portion to obtain image data from the media;
- designating the marginal portions to obtain data representing marginal edges of the media; and
- interrupting operation of the image scanning device if data is detected in the marginal portions of the transducer.

10. A method of controlling an image scanning device having a primary vision transducer for scanning media comprising:
- detecting and noting data representing the location of a leading corner of the media and at least one point along an edge of the media;
- using the data to predict the location of a trailing corner of the media; and
- terminating a scanning process if the predicted location is outside of a predefined limit for the scanning device.

* * * * *